Patented Feb. 15, 1944

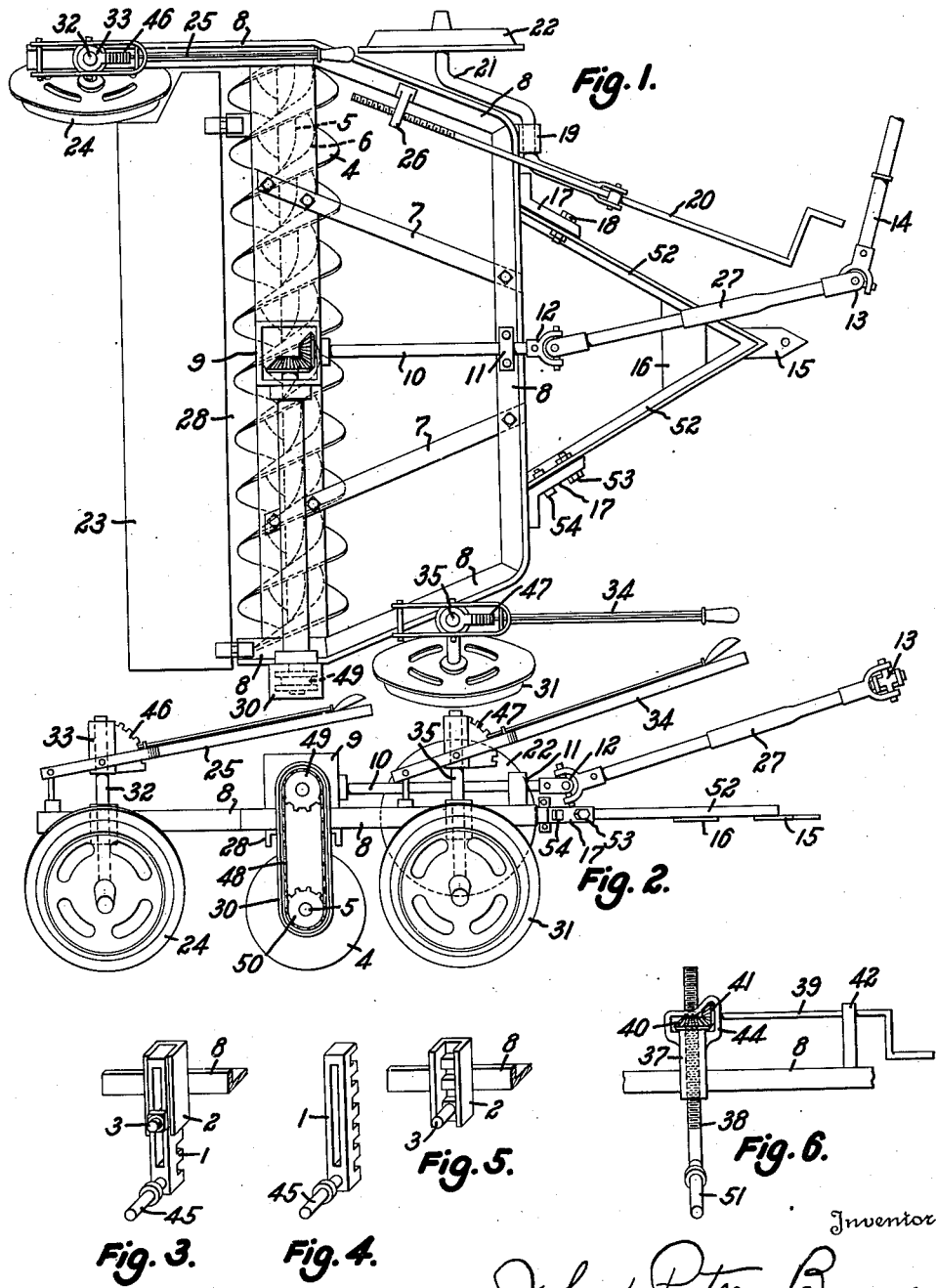

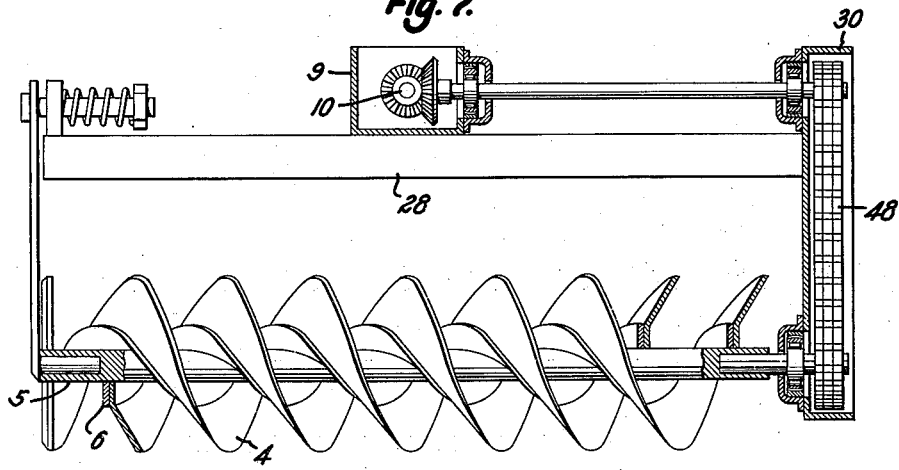
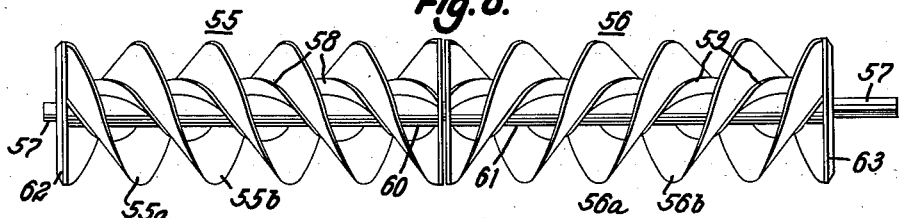
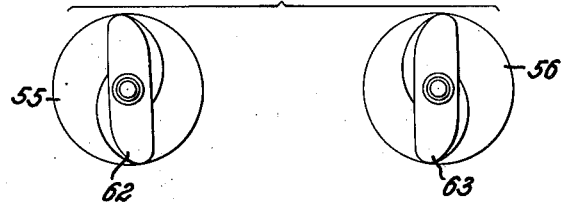
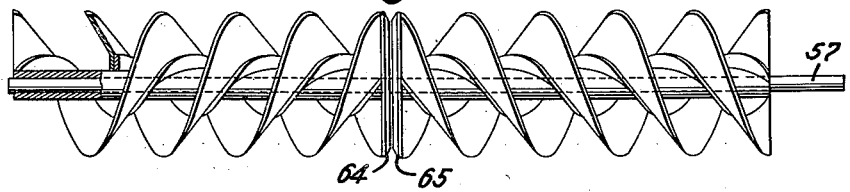

2,342,030

UNITED STATES PATENT OFFICE 2,342,030

ROTARY SPIRAL PLOW

John Peter Bagan, Portland, Oreg., assignor of one-third to Anthony R. Wanezek, Marshfield, Oreg.

Application April 29, 1940, Serial No. 332,220

7 Claims. (Cl. 97—41)

My invention relates to rotary spiral plows and has for its particular object the provision of a plow having a rotary helicoidal blade, which plow may be attached to the draw bar of a tractor or other towing device and also connected to the power take-off means on said tractor so that the rotary blade will be driven at a peripheral speed greater than the speed at which said plow is drawn. That is, the helicoidal blade is driven so that the part thereof in engagement with the ground moves in the opposite direction to that in which the plow is drawn, but at a substantially higher speed so that the blade will actually tear up the soil and at the same time aid the tractor in moving said plow forwardly.

A further object of my invention is to provide a rotary spiral plow of this character which may be operatively connected to many different types of tractors and may be quickly and easily attached and detached with respect thereto and which rotary spiral plow will not require any modification of said tractors.

A further object of my invention is to provide a helicoidal cutter for such a plow which will accommodate removable cutting blades, which blades may be secured in such a manner that they are easily and quickly replaceable.

A further object of my invention is to provide a rotary helicoidal plow in which the cutting blade is so arranged as to impose no end thrust thereon and thus it is adapted for use in chopping up cornstalks, stubble, manure and other residue, properly and uniformly to form a seed bed without shifting said material laterally out of the swath cut by said plow.

Further and other details of my invention are hereinafter described with reference to the accompanying drawings, in which:

Fig. 1 is a plan view of a plow embodying my invention;

Fig. 2 is a side view thereof;

Fig. 3 is a fragmentary perspective view of a wheel bracket and a guide;

Fig. 4 is a fragmentary perspective view of said wheel bracket.

Fig. 5 is a fragmentary perspective view of the guide;

Fig. 6 is a detailed view of the operating mechanism for adjusting a wheel to the frame of said plow.

Fig. 7 is a rearward elevation of the cutter blade and operating devices therefor, embodying my invention, some of said parts being shown in section to disclose features thereof;

Fig. 8 is an elevation of a modified type of cutter blade designed to prevent end thrust;

Fig. 9 is a more or less schematic view illustrating the construction of the ends of the cutter embodying the modification illustrated in Fig. 8;

Fig. 10 is a view similar to Fig. 8 with the spirals shown reversed and with parts shown broken away to disclose detailed construction;

Figure 11:
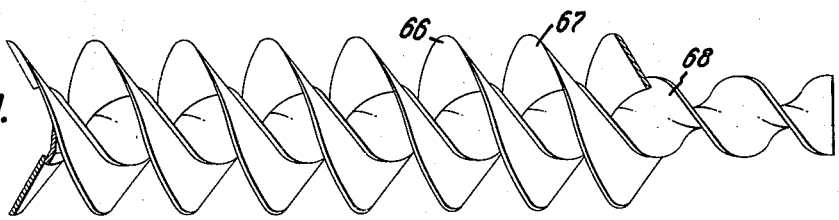
Fig. 11 is a fragmentary elevation of a further modification of cutter blade construction, embodying my invention and comprising two blade members.

Referring first to the structure illustrated on Figs. 1 to 7 of the drawings:

A plow embodying my invention comprises a cutter blade 4 mounted upon a cutter shaft 5. Said cutter blade is mounted upon a center spirally wound flange 6 welded or otherwise secured to the cutter shaft 5. A frame supporting said cutter blade comprises braces 7 and a main angle iron frame 8. A gear housing 9 is supported on the transverse channel member 28 directly over the cutter blade and a shaft 10 extends forward thereof. The forward end of said shaft 10 is journalled in a bearing 11 supported by the frame 8. A drive shaft sleeve 27 is operatively connected to shaft 10 through a universal joint 12. Another universal joint 13 joins said drive shaft sleeve 27 to the power shaft 14 leading to the power take-off of a tractor (not shown) for drawing and powering said plow. A bracket 15 is used for attaching the draw bar hitch 52 to said tractor. Said draw bar hitch has a brace 16 extending transversely thereof and is joined to the frame 8 by a pair of adjustable brackets 17 and bolts 18, 53, and 54.

A depth gauge wheel 22 carried by an offset axle 21 is supported by bearing 19. A screw lift rod 20 engaging a threaded bracket 26 is adapted to rotate said axle in said bearing to fix the vertical height of said depth gauge 22. Trailing the cutter blade is a dirt shield 23, and a furrow wheel 24 lies at the same side of the frame as does the depth wheel 22, but rearwardly thereof. Said furrow wheel 24 may be adjusted for height by a rachet lever 25. This is shown more clearly in Fig. 2. Said wheel 24 is carried by a vertically adjustable axle 32 having a sleeve 33 fixed thereto. A quadrant 46 is engaged by the pawl on rachet lever 25 to fix the heighth at which said furrow wheel axle is lifted.

At one end of said channel member 28 is mounted a housing 30 for enclosing an endless chain 48 engaging sprockets 49 and 50. The cutter blade 4 is rotated by power transmitted from shaft 10 through said chain and sprockets in the manner illustrated in Figs. 1 and 7.

More or less transversely alined with depth gauge wheel 22 but on the opposite side of the frame, is front furrow wheel 31. Said furrow wheel is adjustable as to heighth by rachet lever 34 which is adapted to engage a sector of teeth 47 to lift and lower said wheel 31 in the manner similar to the structure for lifting and lowering furrow wheel 24 by manipulation of the axle 35 for said wheel 31.

If it is desired to use this type of plow for orchard cultivation, I remove the front furrow wheel 31 and the structure associated therewith and substitute a special frame bracket illustrated in Figs. 3, 4 and 5. This bracket comprises a notched rack 1 carrying wheel axle 45 and a notched bracket 2 adapted to be secured to a portion of frame 8. When the complementary notches on said bracket and said rack are in engagement, they may be held fast by threading a nut on to bolt 3 and securing said parts tightly in place.

Another type of wheel adjustment is illustrated in Fig. 6, which is capable of being operated by means of a crank. In said modification a housing 37 is secured to the plow frame 8 and a tapped pinion 40 is threaded upon axle rack 38. Then when pinion 40 is rotated by mashing with gear 41, said rack is moved up and down when crank rod 39 is rotated. Said crank rod 39 is journalled in a bracket 42 adjacent the handle portion and is journalled adjacent gear 41 in housing bracket 44. Wheel axle 51 extends laterally from shaft 38 and thus said axle and the wheel carried thereby will be shifted vertically by the rotation of the internally tapped gear 40, by the mechanism previously described. The ends of shaft 5 are supported to the frame 7, 8, 28 in bearings carried by the housing 30 and the vertical member 29. (See Fig. 7.)

In Fig. 8, I illustrate a cutter blade made up of two oppositely wound oblique helicoidal sections 55 and 56, mounted upon a common shaft 57. Each section comprises two intertwined blades, 55a and 55b, and 56a and 56b, carried by central flanges 58 and 59 welded or secured to tubes 60 and 61, closely surrounding and bearing upon said common shaft 57. At the outer ends of said sections are the cutter blades 62 and 63 (see Fig. 9) which extend normally to the axis of rotation of the shaft 57 and serve as slicing cutters to shear off the turf where the aforesaid blade enters the ground. The soil plowed and operated upon by each of said sections tends to be moved slightly in the direction of twist of the oblique helicoid blade sections. In said figure, the material would tend to be shifted slightly toward the center of the cutter and away from the opposite ends thereof. In Fig. 10, I illustrate how said sections can be reversed so that the soil will tend to be shifted towards the opposite ends of the cutter blades. In this embodiment the cutter blades 64 and 65 are adjacent each other on the inner ends of the two sections of the spiral cutter. Independently of whether the blades are arranged as shown in Fig. 8 or Fig. 10, the dirt will not be shifted beyond the swath formed by the entire cutter blade made up of the said two sections.

In Fig. 11, I show how a cutter blade can be made of two intertwined edge members 66 and 67, wound the same hand and arranged with their inner marginal edges welded or otherwise secured to the edges of a central ribbon member 68, which said ribbon member thus serves as a common central twisted member upon which the oblique helicoidal cutters are mounted.

Figure 12:
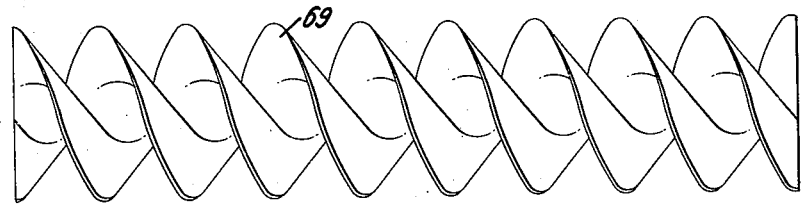
Fig. 12 is a still further modification of a cutter blade made of a single piece of material.

In Fig. 12, I illustrate how a single twisted blade 69 can be arranged as a unitary structure to define both the central member and the helicoidal cutting blade.

Figure 13:
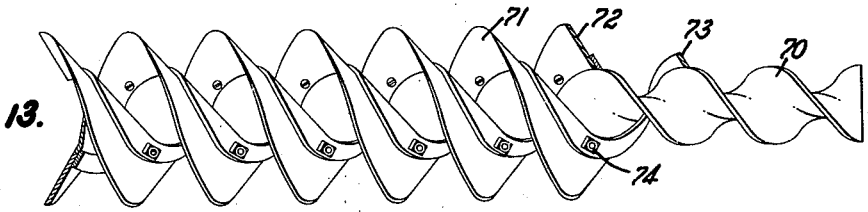
Fig. 13 is an elevation with parts shown broken away, of a modified type of cutter blade embodying my invention, which cutter blade is made of two separable ribbons of material.

In Fig. 13, I illustrate how a central twisted ribbon-like member 70 may have helicoidal cutter blades 71 and 72 removably secured thereto by welding or otherwise securing thereon relatively narrow pieces 73 adjacent to the marginal edges of the central ribbon-like member 70 against which the helicoidal cutter blades 71 and 72 may bear and to which they may be secured by nuts and bolts, 74.

Figure 14:
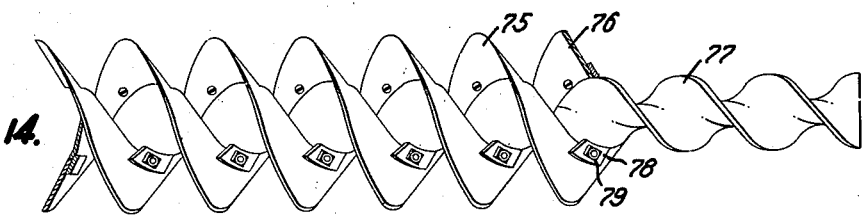
Fig. 14 is a view similar to Fig. 13 except that a slightly different type of fastening device is shown thereon.

In Fig. 14, I illustrate how two helicoidal cutter blades 75 and 76 may be secured to a central ribbon 77 by having spaced lugs 78 formed upon the marginal edges of said central ribbon 77 to which lugs the helicoidal cutters 75 and 76 may be secured by nut and bolt elements 79 or other fastening devices.

Figure 15:
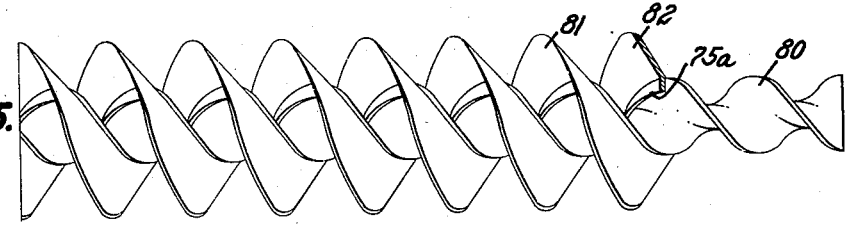
Figs. 15 and 16 are similar fragmentary illustrations of other modifications in cutter blades, embodying my invention.

In Fig. 15, I illustrate how said joining may be secured between a central ribbon-like member 80 and the helicoidal cutter blades 81 and 82 by flanging the inner edges 75a of the cutter blades so as to lie in overlapping relation with the marginal edges of the central ribbon member 80 and being secured by welding or otherwise.

Figure 16:
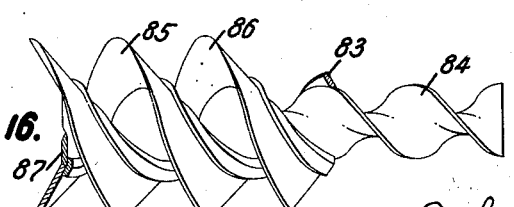

In Fig. 16, I illustrate how a flange 83 may be formed upon the edges of the central ribbon-like member 84, and helicoidal cutter blades 85 and 86 may also be flanged at 87 but to a greater degree, and the two flanges may be arranged to overlie, nested one in the other, to secure a firm seat when said parts are joined together as by welding.

The cutters of Figs. 11 to 16 may be mounted for rotation by means of stub shafts (not shown) welded or otherwise suitably secured to the opposite ends of the ribbons 68, 69, 70, 77, 80 and 84.

I claim:

1. In a rotary spiral plow adapted for tractor operation comprising a frame, wheel supports for the frame, a spiral cutter mounted for rotation on a substantially horizontal axis on said frame, means for coupling said frame to a tractor to propel the same and means for coupling said spiral cutter to a power take off of said tractor to rotate the same, said cutter comprising an axial member of twisted shape and a blade member of oblique helicoidal shape extending outwardly from said axial member.

2. Rotary plow as defined in claim 1 in which said cutter consists of two intertwined blade members of oblique helicoidal shape.

3. Rotary plow as defined in claim 1 in which the blade member is removably secured to said axial member.

4. Rotary plow as defined in claim 1 in which the blade member and the axial member are integral.

5. A spiral cutter for rotary plows comprising an axial member of twisted shape and a blade member of oblique helicoidal shape extending outwardly from said axial member.

6. A spiral cutter as defined in claim 5 in which the blade member is integral with the axial member.

7. A spiral cutter as defined in claim 5 in which the blade member is removably secured to the axial member.

JOHN PETER BAGAN.